United States Patent
Kraft et al.

(10) Patent No.: US 11,583,944 B2
(45) Date of Patent: Feb. 21, 2023

(54) METHOD FOR CUTTING A GROOVE-SHAPED RECESS INTO A WORKPIECE

(71) Applicant: PASS Stanztechnik AG, Creußen (DE)

(72) Inventors: Stefan Kraft, Schnabelwaid (DE); Tobias Inzelsberger, Schnabelwaid (DE)

(73) Assignee: PASS Stanztechnik AG, Creußen (DE)

( * ) Notice: Subject to any disclaimer, the term of this patent is extended or adjusted under 35 U.S.C. 154(b) by 261 days.

(21) Appl. No.: 16/938,988

(22) Filed: Jul. 26, 2020

(65) Prior Publication Data
US 2021/0023635 A1    Jan. 28, 2021

(30) Foreign Application Priority Data
Jul. 25, 2019  (DE) ...................... 10 2019 211 066.5

(51) Int. Cl.
*B23P 13/02* (2006.01)
*B23D 1/26* (2006.01)
*B23B 25/02* (2006.01)
*B23Q 15/013* (2006.01)

(52) U.S. Cl.
CPC ................ *B23D 1/26* (2013.01); *B23B 25/02* (2013.01); *B23Q 15/013* (2013.01); *B23P 13/02* (2013.01)

(58) Field of Classification Search
CPC . B23D 1/26; B23D 3/02; B23D 11/00; B23D 79/00; B23B 25/02; B23Q 15/013; B23Q 11/0042; B23P 13/02; B23P 9/00; B23P 23/04; B08B 1/005
See application file for complete search history.

(56) References Cited

U.S. PATENT DOCUMENTS 5,113,728 A    5/1992   Medeksza

FOREIGN PATENT DOCUMENTS

| DE | 2635105 A | * | 2/1978 | ............ B21B 45/04 |
|---|---|---|---|---|
| DE | 2635105 A1 | | 2/1978 | |
| EP | 3127628 A1 | | 2/2017 | |
| GB | 1534222 A | * | 11/1978 | ............ B21B 45/04 |
| WO | 2014136304 A1 | | 9/2014 | |

OTHER PUBLICATIONS

European Patent Office, Search Report in related application EP 20 184 389.3.

\* cited by examiner

*Primary Examiner* — Jun S Yoo
(74) *Attorney, Agent, or Firm* — Smartpat PLC

(57) ABSTRACT

With a method for cutting a groove-shaped recess in a workpiece, a cutting tool for a machine tool is provided on a workpiece. The cutting tool is displaced into a cutting position, in which the cutting tool is in engagement with the workpiece. The cutting tool in engagement with the workpiece is displaced relative to the workpiece for cutting the groove-shaped recess. Upon cutting, a chip is produced with a predetermined maximum chip length that is less than a total length of the recess to be produced.

14 Claims, 7 Drawing Sheets

METHOD FOR CUTTING A GROOVE-SHAPED RECESS INTO A WORKPIECE

CROSS-REFERENCE TO RELATED APPLICATIONS

The present patent application claims the priority of German patent application DE 10 2019 211 066.5, the contents of which are incorporated by reference herein.

TECHNICAL FIELD

The invention relates to a method for cutting a groove-shaped recess in a workpiece.

BACKGROUND

EP 3 127 628 A1 discloses a method with which a chip produced when cutting a groove-shaped recess is broken by means of a resistance element, which is arranged in a chip channel of a cutting tool. The resulting chip length cannot be determined exactly with this method, because it depends on material parameters, process parameters and random factors. The risk remains that chips with increased chip length will clog the chip channel. Based on resulting downtimes, the economic efficiency of the method is reduced. U.S. Pat. No. 5,113,728 A discloses a method for machining a workpiece.

SUMMARY

It is an object of the invention to provide a method for cutting a groove-shaped recess that reliably prevents the clogging of a chip channel and can thus be carried out particularly economically.

This object is achieved by a method as claimed. It was recognized that the method for cutting the groove-shaped recess into the workpiece, with which a chip with a predetermined maximum chip length is produced upon cutting, the length being less than the total length of the recess to be produced, reliably prevents the clogging of chip channels, by which downtimes can be reduced and whereby the method can be carried out particularly economically. Chip length is understood to be the length of the chips resulting from the cutting of the recess, in particular those removed from the cutting tool via a chip channel. By producing the chips with the predetermined maximum chip length, chips with a longer chip length, which could lead to clogging of the chip channel, can be prevented. In particular, the predetermined maximum chip length is independent of process parameters, in particular a cutting speed and/or a cutting depth and/or a cutting width, and/or of material properties of the workpiece. Thereby, it is advantageously achieved that the chip length can be predetermined independently of changing, in particular uncontrollable, influencing factors.

The groove-shaped recess to be produced is understood to be an uninterrupted, that is to say, continuous recess in the workpiece.

Preferably, the predetermined maximum chip length is adjustable. For example, the predetermined maximum chip length can be set depending on process parameters and/or material parameters of the workpiece. For example, the predetermined maximum chip length can be set according to the conveying properties of the chip and/or the chip channel. The cutting of the recess can thus be carried out with particular efficiency.

The chip with the predetermined maximum chip length is understood to be a chip whose length is at most as large, in particular equal to or smaller than the predetermined chip length.

Preferably, the chip is produced upon cutting with exactly the predetermined chip length, in particular a predetermined, fixed chip length. A resulting chip length can deviate from the predetermined chip length by a maximum of 50%, in particular by a maximum of 25%, in particular by a maximum of 10%, in particular by a maximum of 5%, in particular have a chip length shorter by this maximum percentage. The chip removal can thus be carried out even more reliably.

Preferably the cutting tool is provided on the machine tool. The cutting tool can be attached to the machine tool, in particular reversibly detachable. The displacement of the cutting tool, in particular into the cutting position and/or relative to the workpiece, in particular for cutting the groove-shaped recess, is preferably done by means of the machine tool. The machine tool may have a positioning device, in particular with a positioning drive, in particular with a positioning motor, for displacing the cutting tool. Preferably, the cutting tool is attached to the positioning device for the displacement into the cutting position and/or relative to the workpiece. The machine tool is preferably a punching device for machining a workpiece, in particular comprising punching tools.

Preferably, the cutting tool is designed as a slotting tool, in particular in accordance with previously known tools for carrying out planing processes and/or slotting processes. The cutting tool can comprise an exchangeable cutting device, in particular a grooving tool and/or a grooving plate and/or a planing chisel and/or a slotting chisel, which engages the workpiece for cutting the recess. Thereby, it is advantageously achieved that maintenance and repair of the cutting tool can be carried out with particular ease and efficiency.

According to one aspect of the disclosure, the cutting tool comprises an upper tool part and a lower tool part. The workpiece can be arranged between the upper tool part and the lower tool part to cut the recess. The workpiece is preferably a sheet, in particular a metal sheet. Preferably, the recess is cut from the workpiece by the lower tool part. The produced chips can thus be removed from the cutting tool by gravity.

The cutting tool is displaced relative to the workpiece along a machining path while in engagement with the workpiece. The machining path can be flat, in particular parallel to the workpiece surface. In particular, the machining path can be straight. The total length of the recess to be produced is preferably determined by the length of the machining path.

The predetermined chip length may be achieved by separating the chip directly at the workpiece. This guarantees the production of the chip with the predetermined, in particular maximum, chip length in a particularly reliable manner. The influence of material properties of the workpiece and/or of process parameters on the chip length can be avoided as far as possible by separating the chip directly at the workpiece. Thus, the clogging of the chip channel can be prevented in a particularly reliable manner. Separation of the chip directly at the workpiece means that the separation takes place at a distance from a shearing edge at which the chip is sheared off the workpiece, which corresponds to a maximum of 20%, in particular a maximum of 10%, in particular a maximum of 5% of the predetermined chip length.

The predetermined chip length may be achieved by displacing the cutting tool, after cutting a predetermined groove section length, into a reset position in which the cutting tool is out of engagement with the workpiece. This is particularly easy to implement, in particular with conventional cutting tools and/or machine tools. It is also particularly reliable in operation. The groove section length is understood to be a length of the recess that is less than the total length of the recess to be produced. The predetermined maximum chip length, in particular the predetermined chip length, preferably corresponds to the groove section length. The displacement of the cutting tool relative to the workpiece, in particular over at least two of the groove sections, can be carried out discontinuously. In particular, the cutting tool can be displaced back into an already cut area of the groove to be produced after cutting the respective groove section. A continuous displacement of the cutting tool relative to the workpiece is understood to mean that the displacement, in particular parallel to a surface of the workpiece and/or to a longitudinal extension of the recess, is free of reversing movement, in particular at a constant speed.

The cutting tool may be repeatedly displaced between the cutting position and the reset position while cutting the groove-shaped recess This is applicable with particular flexibility. Given the fact that the cutting tool is repeatedly displaced between the cutting position and the reset position, chips with the predetermined maximum chip length, in particular the predetermined chip length, can be produced, wherein the total length of the recess to be produced is adjustable. Preferably, the recess to be produced is produced by producing at least 2, in particular at least 5, in particular at least 10, in particular at least 20, groove sections. Thus, the predetermined maximum chip length, in particular the predetermined chip length, can be set as small as desired for a given total length of the recess to be produced.

The cutting tool may be displaced relative to the workpiece over at least 50% of the total length of the recess without a backward displacement of the cutting tool along to the recess to be produced. This guarantees a cutting of the groove-shaped recess that is time-efficient and does not damage the machine. Preferably, the cutting tool is continuously displaced relative to the workpiece over at least two, in particular at least three, in particular at least five, adjacent groove sections, in particular over the total length of the recess to be produced. Thus, loads acting on the machine tool due to masses to be accelerated can be reduced. The cutting tool can be displaced along the at least two groove sections relative to the workpiece without a reversing movement. The continuous displacement preferably relates to a movement component oriented parallel to the workpiece surface. The continuous displacement is preferably carried out through the repeated displacement between the reset position and the cutting position. In particular, the upper tool part can be displaced relative to the workpiece in a shaft movement, wherein the shaft troughs have a straight section corresponding to the groove section length and/or the predetermined maximum chip length, in particular the predetermined chip length, and wherein the lower tool part engages with the workpiece in the area of the shaft troughs.

The cutting of the recess may take place in at least two machining steps. The recess to be produced may have interruptions along its longitudinal extension after a first machining step, and the interruptions may be removed in a subsequent machining step. This is particular time-efficient and does not damage the machine. Interruptions are to be understood to mean incompletely machined, in particular unmachined, areas of the recess to be produced, which extend between two advanced, in particular completely machined, groove sections to be joined. The interruptions can be removed in the second machining step or in at least two, in particular at least three, in particular at least five, further machining steps. A machining step is determined by the fact that the cutting tool is displaced along at least 80% along the total length of the recess to be produced. Preferably, the cutting tool is displaced completely along the total length relative to the workpiece in each of the machining steps. Given the fact that the cutting of the recess is carried out in a plurality of machining steps, the predetermined maximum chip length, in particular the predetermined chip length, can be produced as far as possible independently of the displacement component of the cutting tool relative to the workpiece, which is oriented parallel to the workpiece surface, and thus in a particularly flexible manner.

An interruption length may essentially correspond to a groove section length of directly adjacent groove sections already produced. This is particularly robust in operation. Preferably, the groove sections are cut in the first machining step and the interruptions are removed in the second machining step. The cutting tool can remain in the cutting position during the entire second machining step. Given the fact that the interruption length is essentially the same as the groove section length, the predetermined maximum chip length, in particular the predetermined chip length, of the chips produced is essentially identical in the first and second machining steps.

The incompletely machined groove section can have a cross-section that is smaller than a cross-section of the recess to be produced. The interruption refers to such cross-section of the adjacent and possibly incompletely machined groove sections already produced along the longitudinal extension of the recess to be produced.

The cutting of the recess may be carried out in at least two machining steps. A cross-section of the recess may be produced incompletely at least in sections after a first machining step and be completed in a subsequent machining step. This guarantees the cutting of the recess in a particularly flexible and precise manner. Given the fact that the recess is cut into the workpiece in at least two machining steps, the amount of material removed per machining step is reduced, by which an increased precision can be obtained. Furthermore, recesses can be cut into the workpiece step-by-step, which increases the flexibility of the method, in particular with regard to particularly large cross-sections to be produced. A machining step is in turn determined by the fact that the cutting tool is displaced along at least 80%, in particular completely, along the entire length of the recess to be produced. Preferably, the cross-section is produced in at least three, in particular at least five, in particular at least ten, machining steps.

According to a particularly preferred aspect, the production of the cross-section of the recess in a plurality of machining steps is combined with a production of the recess with interruptions along its longitudinal extension.

The cutting in the first machining step may take place in a partial cutting depth, which is less than a total cutting depth of the recess to be produced. This guarantees the cutting of the recess with a particularly large total cutting depth, in particular in relation to a workpiece thickness. The cutting of the recess can be carried out in at least three, in particular in at least five, in particular in at least ten, machining steps with each increasing partial cutting depth.

The cutting in the first machining step may take place at a partial cutting width, which is smaller than a total cutting width of the recess to be produced. This guarantees a particularly precise cutting of the recess for large cross-sections, in particular in relation to the workpiece dimensions. Furthermore, the precise cutting of recesses in workpieces with particularly high rigidity is reliably guaranteed. Preferably, the cutting of the recess is carried out in a plurality of machining steps, wherein, in successive machining steps, the cutting depth is increased step-by-step and/or the cutting position in transverse direction to the recess to be produced is modified on a step-by-step basis.

According to one aspect, groove sections are produced in one machining step, which are separated from each other by interruptions. Such interruptions are cut from the workpiece in a subsequent work step.

Alternatively, a plurality of the groove sections extending along the groove to be produced can be produced over the same groove section length and at different cutting depths and/or cutting widths, before the interruptions remaining between the groove sections are removed from the workpiece in one or more of the machining steps.

The cutting may be carried out in at least two machining steps. The cutting tool may be displaced in each of the at least two machining steps along an overall length of the recess to be produced. This is particularly efficient and robust. Given the fact that the cutting tool is displaced along the total length of the recess to be produced in each of the machining steps, the masses to be accelerated can be reduced and the displacement of the cutting tool relative to the workpiece can be carried out particularly quickly.

Before the cutting, the workpiece may be plastically pre-deformed in an area of the recess to be produced at an embossing distance corresponding to the predetermined chip length. This is particularly energy-efficient and robust. The plastic deformation is preferably carried out locally, in particular within the cross-section of the recess to be produced. The workpiece can be hardened in the area of the plastic deformation. Preferably, this leads to local embrittlement of the material. By introducing the plastic pre-deformation, predetermined breaking points are produced along the recess for the resulting chip. When the recess is cut into the workpiece, the resulting chip is cut off at the plastic pre-deformations. An embossing distance between the plastic pre-deformations essentially corresponds to the predetermined, in particular maximum, chip length. Parallel to the workpiece surface, the cutting tool is preferably displaced continuously, in particular at constant speed, over the entire length of the recess to be produced. Preferably, the cutting tool remains in the engagement position for at least one machining step. The cutting of the recess to be produced can be carried out in a single machining step.

An embossing tool may be provided on the machine tool for the plastic deformation of the workpiece. The embossing tool can have a flat, linear or punctiform embossing engagement. Preferably, the embossing tool is designed as a center punch, in particular with a punctiform, in particular conical, embossing engagement. The embossing tool and/or the cutting tool are preferably designed to be inserted into a machine turret of the machine tool. Thus, the tool change can be carried out on an automated basis.

The workpiece may be edge bent at the groove-shaped recess. This is particularly flexible in use. Preferably, an edge bending tool is provided on the machine tool for edge bending the workpiece at the groove-shaped recess. Given the fact that the edge bending of the workpiece takes place at the groove-shaped recess, the stresses acting on the workpiece and the forces required for deformation are particularly low. The edge bending tool is preferably designed to be inserted into a machine turret of the machine tool.

The cutting tool may be provided on a punching device. This guarantees a particularly efficient machining of the workpiece. Given the fact that the cutting tool is provided at the punching device, the range of application of the punching device increases. Preferably, the cutting tool and/or the embossing tool and/or the edge bending tool and/or at least one punching tool can be arranged on the punching device, in particular on the machine turret.

Further features, advantages and details of the invention can be found in the following description of a plurality of exemplary embodiments.

DETAILED DESCRIPTION

Figure 1:
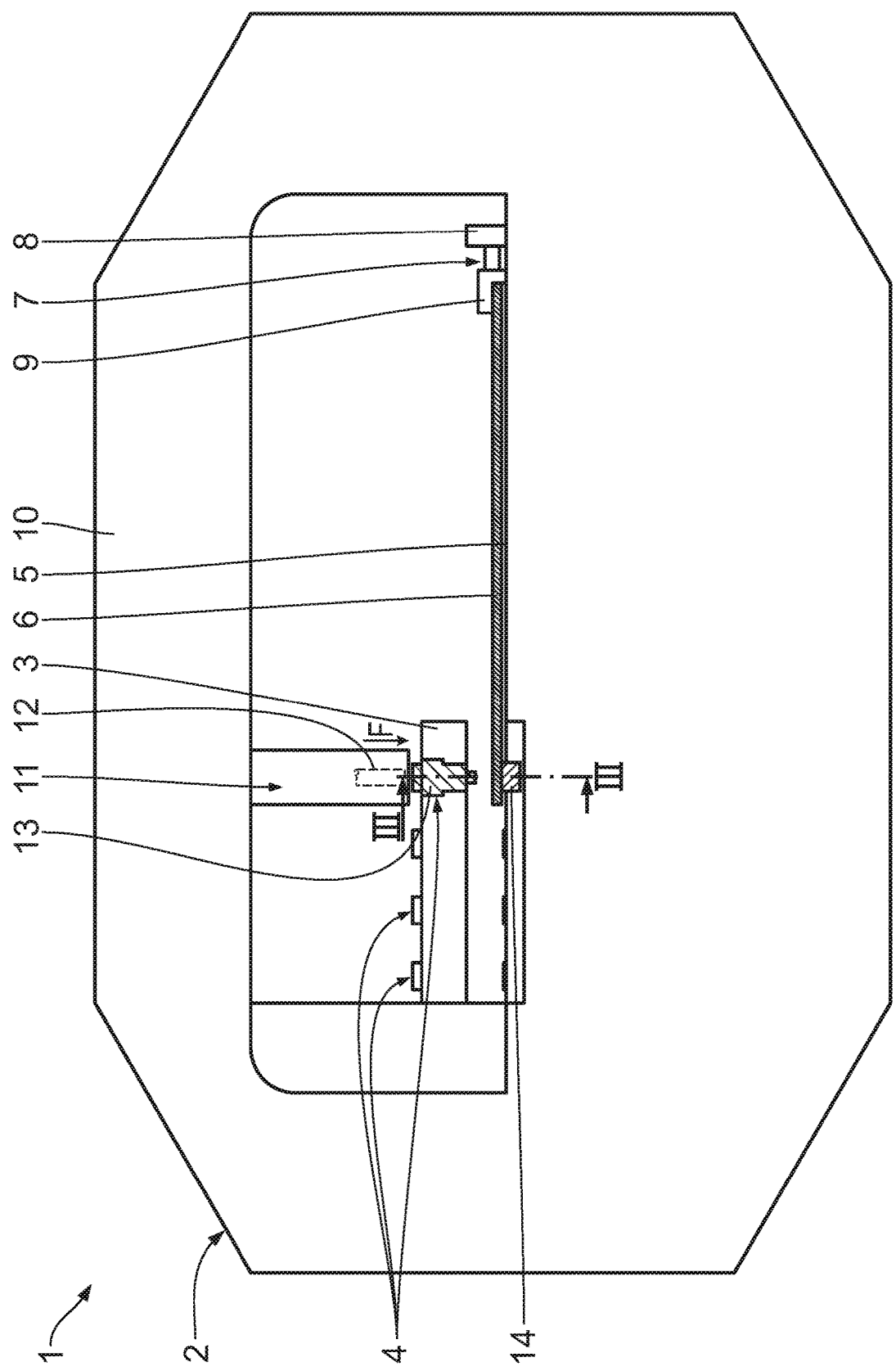
FIG. 1 is a schematic side view of a machine tool with a cutting tool for cutting a groove-shaped recess into a workpiece.

In FIG. 1, a machine tool 1 is shown with a frame structure 2, a machine turret 3 connected thereto for receiving the machining tools 4, a machining table 5 for carrying a workpiece 6 to be machined and a positioning device 7 for displacing the workpiece 6 relative to the machining table 5. The machine tool 1 is designed as a punching device. The workpiece 6 is a sheet, in particular a metal sheet. The positioning device 7 comprises a positioning drive 8, which is connected to a clamping device 9. The workpiece 6 is reversibly fixed to the clamping device 9 and can be displaced relative to the machining table 5 by the positioning drive 8.

An actuating device 11 is arranged on an upper frame part 10 of the frame structure 2. The actuating device 11 comprises a slide 12 for driving an active machining tool 4 arranged below the slide 12. The slide 12 can be displaced in the vertical direction to exert a contact pressure F on the active machining tool 4. To transmit a rotary motion to the active machining tool 4, the slide 12 can be driven around a vertical axis in a rotatable manner. Thereby, a changing alignment of the machining tool 4 along different machining directions can take place. According to an alternative design, instead of or in addition to the slide 12, a tool receiver for connecting the machining tool 4 to the machine tool 1, in particular to the machine turret 3, can be driven around the vertical axis in a rotatable manner.

The machine turret 3 is connected to the frame structure 2 in a rotatably drivable manner. The active machining tool 4 can be selected from a plurality of machining tools 4 arranged on the machine turret 3 by rotatably driving the machine turret 3.

Figure 2:
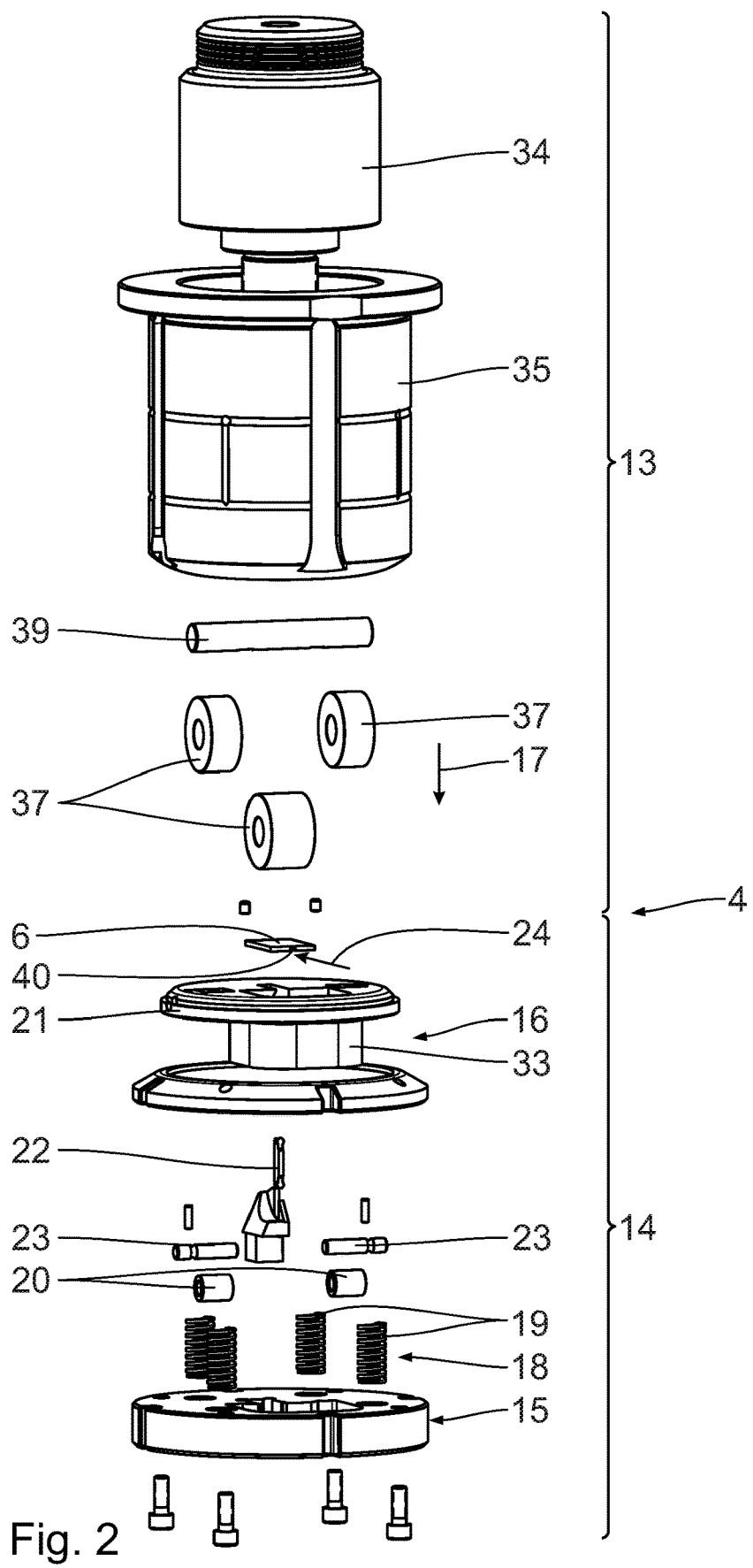
FIG. 2 is an exploded view of the cutting tool in FIG. 1 comprising a tool upper part and a tool lower part, wherein the tool lower part has a cutting device for working together with the workpiece.

In FIG. 2, the cutting tool 4 is shown in more detail. The active machining tool 4 is designed as a cutting tool 4. The cutting tool 4 comprises an upper tool part 13 and a lower tool part 14. The upper tool part 13 is arranged vertically above the machining table 5, in particular above the workpiece 6. The lower tool part 14 is arranged on a lower side of the machining table 5, below the workpiece 6.

The tool lower part 14 comprises a lower part base body 15 and a lower part scraper 16 connected to it.

The lower part scraper 16 is mounted on the lower part base body 15 so that it can be displaced along a feed direction 17. The feed direction 17 is oriented in a manner parallel to the vertical direction. A pre-tensioning device 18, which pre-tensions the lower part scraper 16 in the direction of the upper tool part 13, is arranged between the lower part base body 15 and the lower part scraper 16. The pre-tensioning device 18 comprises four spiral springs 19 designed as compression springs.

Figure 3:
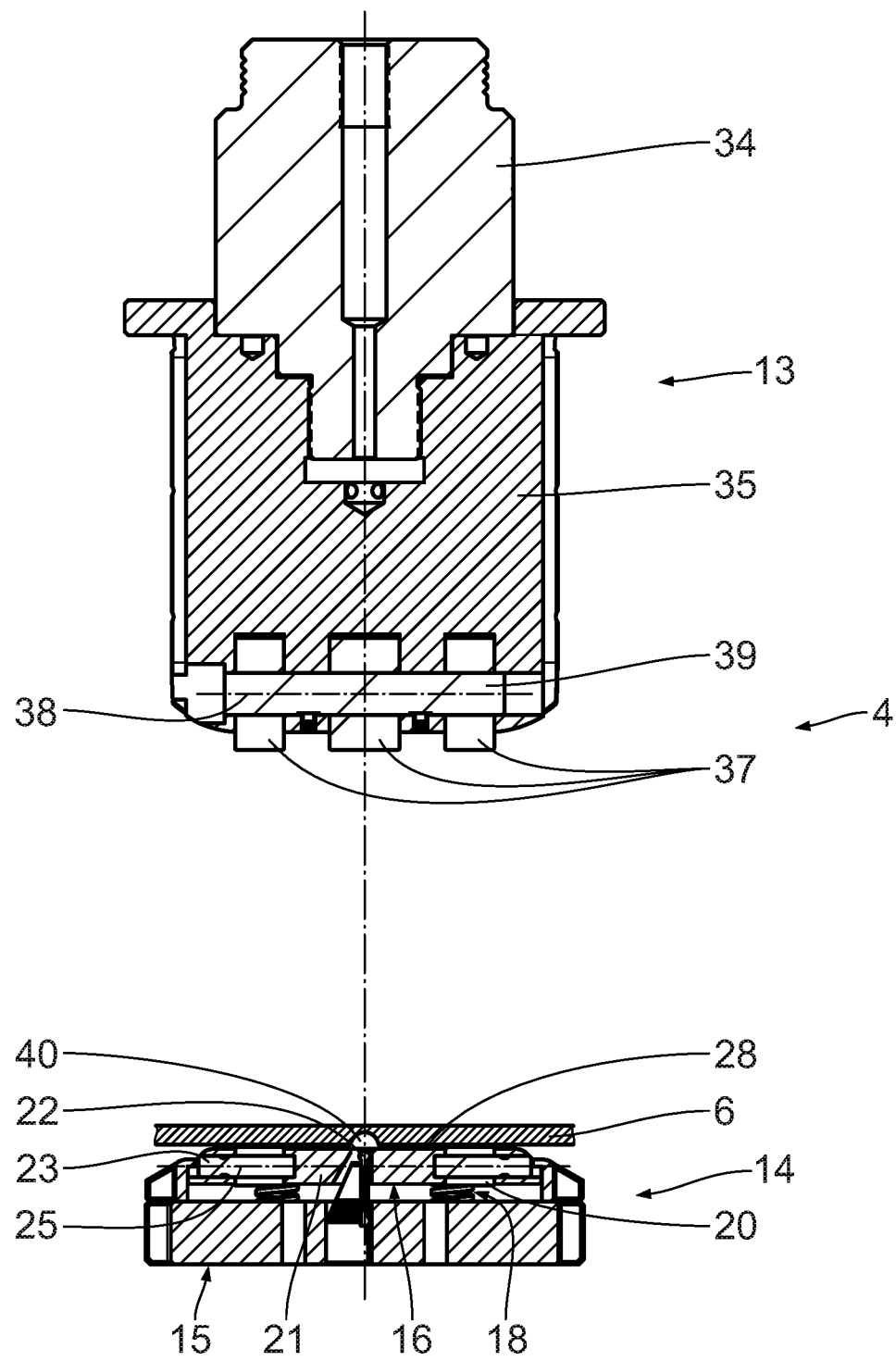
FIG. 3 is a sectional view of the cutting tool along the cutting line in FIG. 1, wherein the tool lower part of the cutting tool has a lower part base body and a lower part scraper mounted thereon so as to be displaceable along a feed direction and wherein the cutting tool is arranged in a reset position, in which the cutting tool is out of engagement with the workpiece.

In FIG. 3, the cutting tool 4 is cut along a longitudinal axis and is shown in its assembled state. The lower part scraper 16 comprises two lower part roller bodies 20, which are rotatably mounted on a scraper base body 21.

The lower part scraper 16 can be displaced between a cutting position and a reset position. The pre-tensioning device 18 pre-tensions the lower part scraper into the reset position. In the reset position, the lower part scraper 16 is displaced relative to the lower part base body 15 in the direction of the upper tool part 13.

A cutting device 22 is attached to the lower part base body 15. The cutting device 22 protrudes above the lower part scraper 16 in the cutting position in the direction of the upper tool part 13. In the reset position, the lower part scraper 16 protrudes above the cutting device 22 in the upward direction.

Figure 4:
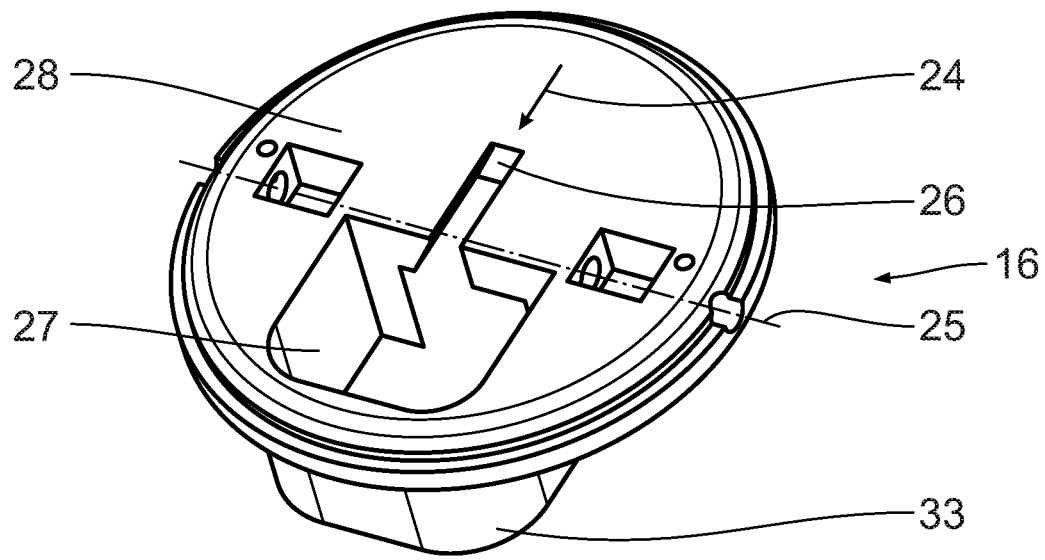
FIG. 4 is a perspective view of the lower part scraper in FIG. 3.

In FIG. 4, the lower part scraper 16 is shown in more detail. For the rotatably movable mounting of the lower part roller bodies 20, each of the lower part scrapers 16 comprises one lower part roller bearing 23. The lower part roller bodies 20 are mounted rotatably around a horizontal lower part rotation axis 25 oriented in a manner perpendicular to a feed direction 24.

The lower part scraper 16 comprise a cutting device recess 26 through which the cutting device 22 extends in the cutting position. A chip channel 27 of the lower part scraper 16 is designed for the removal of chips that are produced during the machining of the workpiece 6. Furthermore, the lower part scraper 16 has a workpiece support 28 formed parallel to a surface of the machining table 5 for guiding the workpiece 6 along the horizontal direction.

Figure 5:
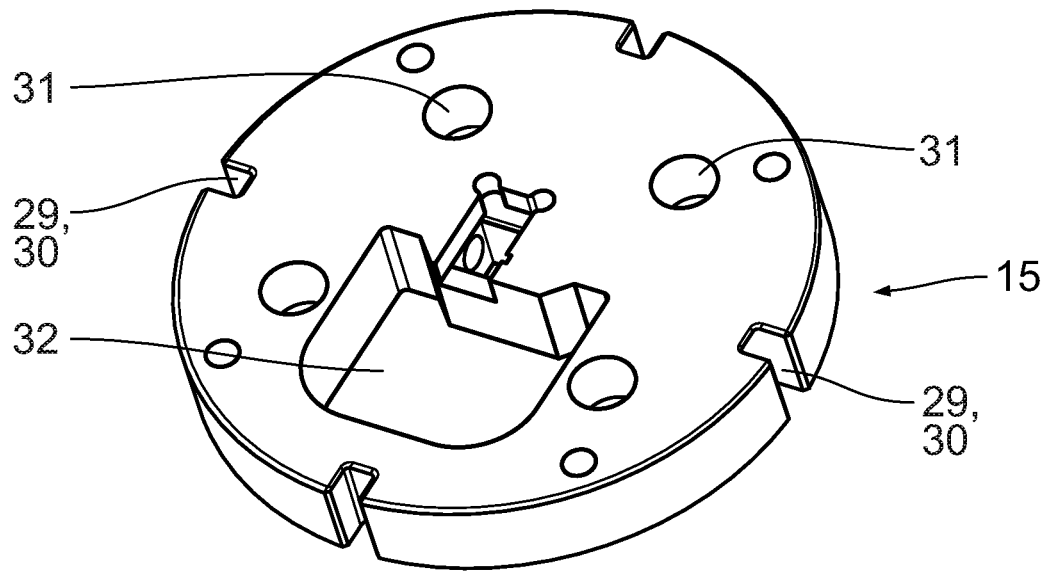
FIG. 5 is a perspective view of the lower part base body in FIG. 3.

In FIG. 5, the lower part base body 15 is shown in more detail. For driving the lower tool part 14 in rotation around the feed direction 17, the lower part base body 15 comprises an engagement device 29. The engagement device 29 has four groove-shaped engagement notches 30. The spiral springs 19 are each arranged in a receiving bore 31 of the lower part base body 15. The lower part base body 15 has a chip channel recess 32 for the removal of chips produced during workpiece machining. The chip channel 27 penetrates the chip channel recess 32.

By means of a collar 33 forming the chip channel 27, the lower part scraper 16 is connected to the lower part base body 15 in order to connect the feed direction 17 in a torque-proof manner.

The tool upper part 13 comprises a head unit 34 and a pressing unit 35. The head unit 34 is designed to work together with the slide 12.

The tool upper part 13 comprises three upper part roller bodies 37, which are mounted on an upper part roller bearing 39 of the pressing unit 35 in order to rotatably mount an upper part rotation axis 38.

The machine tool 1 and the cutting tool 4 function as follows:

The workpiece 6 is arranged on the machining table 5 and is connected to the clamping device 9. The cutting tool 4 is located below the slide 12 of the actuating device 11.

By means of the positioning drive 8, the workpiece 6 is displaced between the upper tool part 13 and the lower tool part 14. In particular, the workpiece 6 is arranged in a position in which the cutting device 22 is located below and in a horizontal direction 0.1 mm to 10 mm away from a groove-shaped recess 40 to be produced. The cutting tool 4 is in a reset position, in which it is out of engagement with the workpiece 6.

By means of the slide 12, the cutting tool 4 is displaced vertically in the direction of the workpiece 6. The upper section roller bodies 37 come into contact with the workpiece 6. The lower part scraper 16 is displaced downwards in the feed direction 17 against the action of the pre-tensioner 18 due to the contact pressure transmitted to the workpiece 6 via the upper section roller bodies 37. Thereby, the workpiece 6 moves in the direction of the cutting device 22. The cutting device is further spaced apart from the workpiece 6 in the horizontal direction. Along one cutting direction, the cutting device 22 overlaps the workpiece 6.

For cutting the groove-shaped recess 40, the cutting tool is displaced relative to the workpiece 6 by the positioning drive 8. The cutting device 22 arrives in engagement with the workpiece 6. The cutting tool is located in the cutting position.

Figure 6:
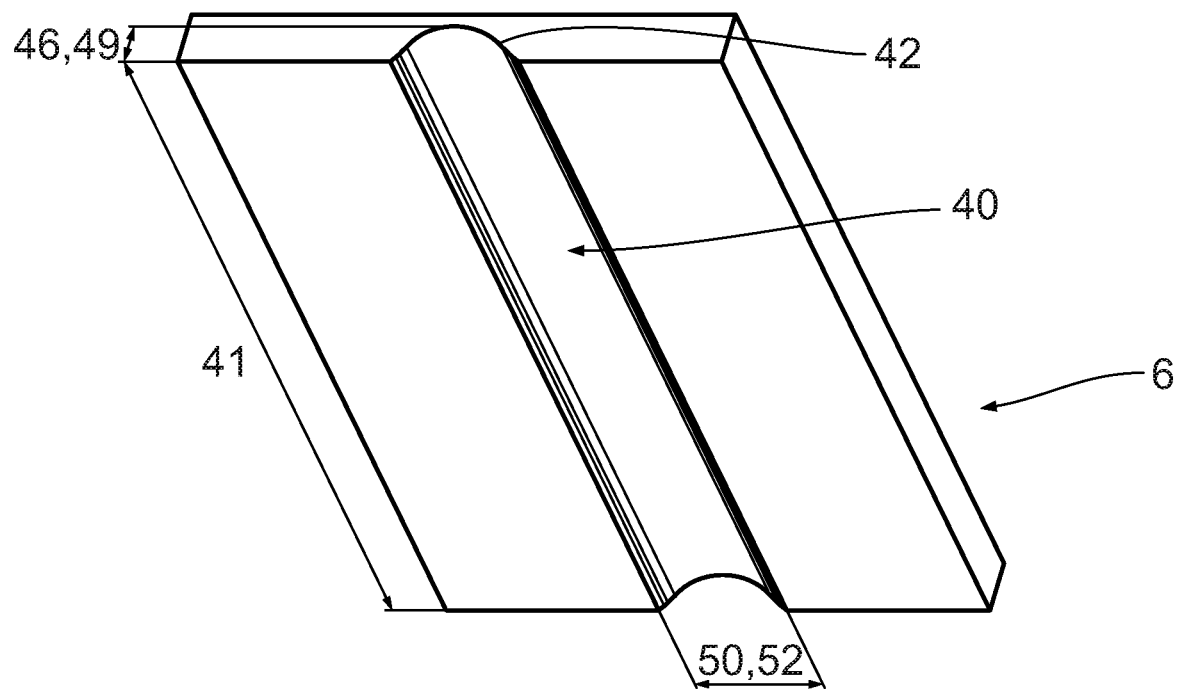
FIG. 6 is a perspective view of the workpiece in FIG. 1 with the produced groove-shaped recess.
Figure 7:
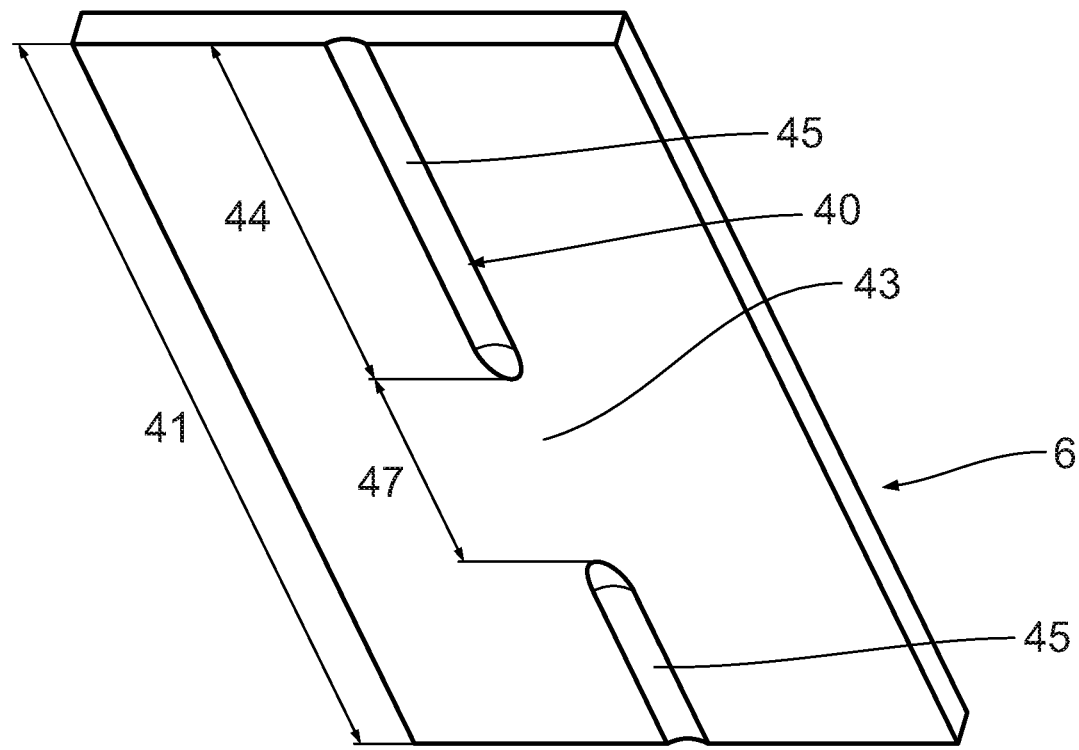
FIG. 7 is a perspective view of the workpiece in FIG. 1, wherein the cutting of the recess is carried out in two machining steps according to a first exemplary embodiment and wherein the recess after the first machining step has interruptions along its longitudinal extension, which are removed in the second machining step.

On the basis of FIG. 6 and FIG. 7, a first embodiment of the machining method is described. The recess 40 to be produced extends along a total length 41. A cross-section 42 of the recess 40 is essentially parabolic.

The cutting of the recess 40 is carried out in two machining steps. In the first machining step, the cutting tool 4 is moved from an edge area of the workpiece 6 over the total length 41 of the recess 40 to be produced. Thereby, the cutting tool 4 is displaced repeatedly between the cutting position and the reset position. In particular, the cutting tool 4 is continuously displaced relative to the workpiece 6 during the two work steps, in particular at a constant horizontal speed.

When cutting the recess 40 into the workpiece 6, a chip (not shown) is produced. The displacement of the cutting tool 4 leads to interruptions in chip production and separates the chip from the workpiece 6. The chip is separated directly at the workpiece 6, in particular at its shearing edge.

In the reset position, the cutting tool 4 is displaced relative to the workpiece 6 without a further cutting of the recess 40. The recess 40 to be produced has interruptions 43 in those areas in which the cutting tool 4 was arranged in the reset position in the first machining step.

The chip produced upon cutting has a predetermined maximum chip length, which essentially corresponds to a groove section length 44 of the groove sections 45 produced in the first machining step.

In the second machining step, the cutting tool 4 is in turn displaced relative to the recess 40 over the total length 41. The cutting tool 4 remains in the engagement position. A cutting depth 46 in the second machining step corresponds to a cutting depth 46 in the first machining step. The chip formation therefore takes place exclusively in the area of the interruptions 43. The predetermined maximum chip length is essentially identical to an interruption length 47 between the groove sections 45 produced in the first machining step.

The chips produced with the predetermined, maximum chip length are discharged downwards from the cutting tool 4 via the chip channel 27 due to gravity. Given the fact that the chip channel 27 penetrates the chip channel recess 32, the sticking of the chips in a transition area between the lower part base body 15 and the lower part scraper 16 is reliably prevented.

Preferably, the groove-shaped recess 40 is designed as an edging groove. For the edge bending of the workpiece 6, an edge bending tool (not shown) is provided, in particular on the machine tool 1. By means of the edge bending tool, the workpiece 6 is formed by bending around a bending axis determined by a main extension of the recess 40. The edge bending of the workpiece 6 can take place with particular precision at the groove-shaped recess 40. In particular, the material stress can be reduced due to the wall thickness reduced in the area of the recess 40. A smaller bending radius can be achieved.

Figure 8:
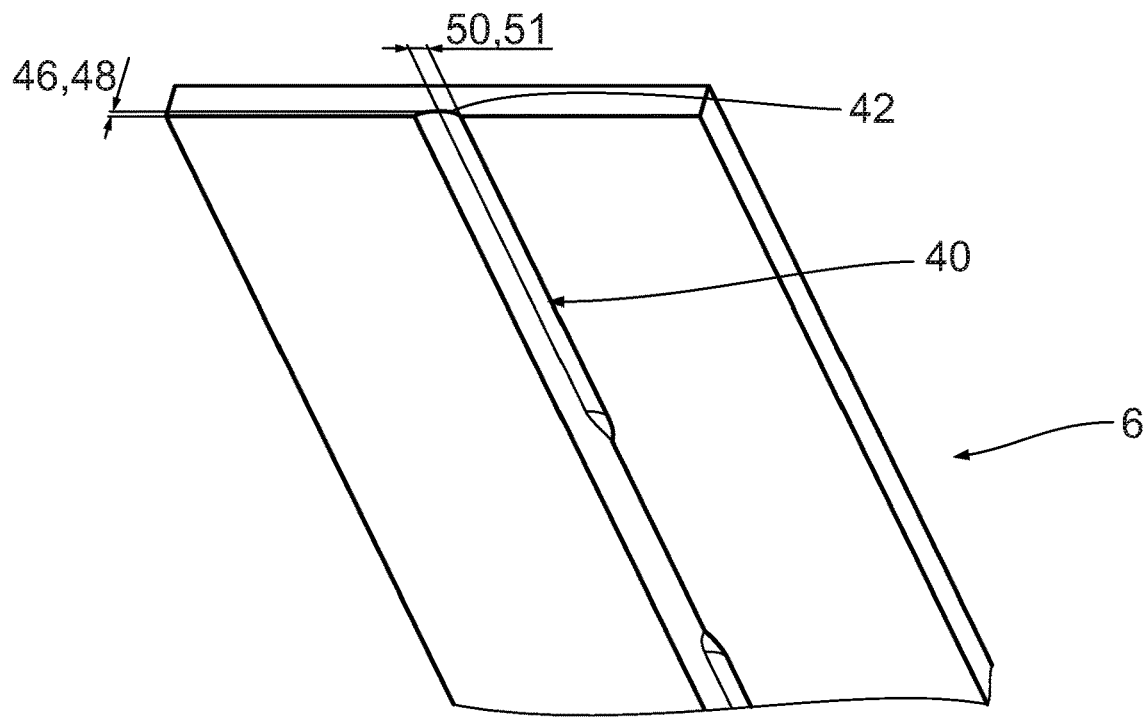
FIG. 8 is a perspective view of the workpiece similar to that in FIG. 1, wherein the cutting of the recess is carried out in a plurality of machining steps according to an additional exemplary embodiment and wherein a cross-section of the recess is produced incompletely after the first machining step and appears to be completed in a subsequent machining step.

On the basis of FIG. 8, an additional exemplary embodiment of the cutting process is described. In contrast to the exemplary embodiment described above, the cutting of the recess 40 is carried out in more than two machining steps. In particular, the cross-section 42 is produced incompletely after the first machining step. The cross-section 42 is enlarged in a step-by-step manner.

For this purpose, the cutting tool 4 is displaced into the engagement position, wherein a cutting depth 46 in the first machining step corresponds to a partial cutting depth 48, which is less than a total cutting depth 49 of the recess to be produced 40. Furthermore, a cutting width 50 corresponds to a partial cutting width 51, which is less than a total cutting width 52.

In accordance with the exemplary embodiment described above, the cutting tool 4 is moved in each machining step over the total length 41 of the recess 40 to be produced. Thereby, in a first machining step, the machining tool 4 is displaced repeatedly between the engagement position and the reset position. The resulting chip length essentially corresponds to the groove section length 44 of the produced groove sections 45. In a subsequent machining step, the cutting tool 4 is displaced along the recess to be produced at the same partial cutting depth 48 and remaining in the engagement position.

Prior to the subsequent machining step, the cutting tool 4 is offset in the width direction of the recess 40 to be produced. The two machining steps described above are carried out with the cutting tool 4 offset in the width direction relative to the workpiece 6. Thereby, the cross-section 42 is expanded in the width direction.

The machining steps described above are carried out repeatedly until the width of the produced section 42 at the height of the partial cutting depth 48 corresponds to a target width.

The cutting tool is then advanced further in the direction of workpiece 6. The cutting device 22 engages with the workpiece 6 at a greater partial cutting depth 48. The machining steps described above are carried out repeatedly. The cutting tool 4 is advanced in a step-by-step manner in the direction of workpiece 4 until the total cutting depth 49 is reached and the cross-section 42 to be achieved is completely produced over the total length 41.

Figure 9:
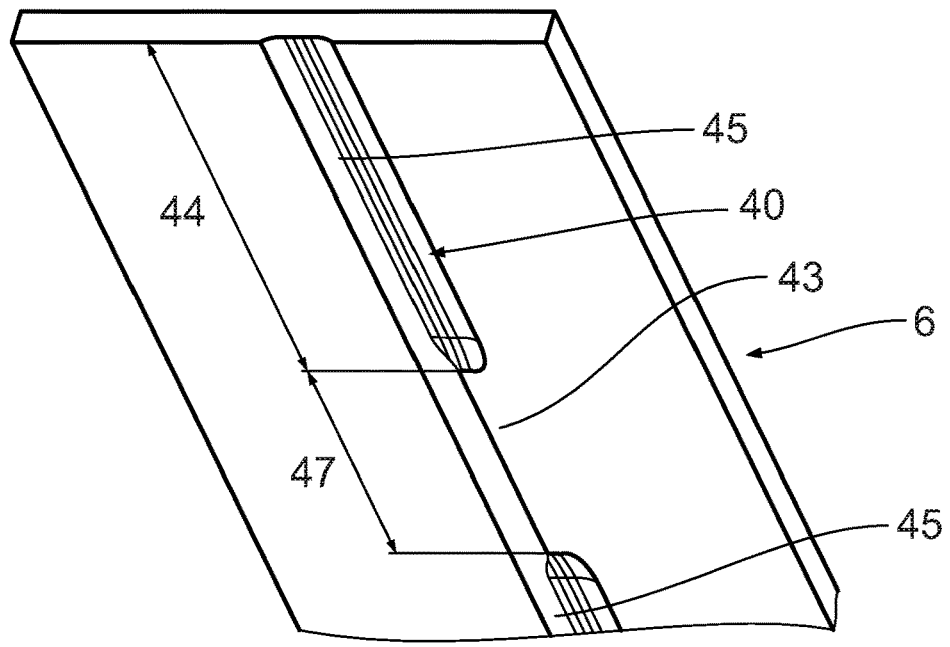
FIG. 9 is a perspective view of the workpiece similar to that in FIG. 1, wherein the cutting of the recess is carried out in a plurality of machining steps in accordance with an additional exemplary embodiment and wherein a cross-section of the recess is produced at least in sections in a plurality of machining steps, wherein the recess has interruptions at least in sections along its longitudinal extension.

On the basis of FIG. 9, an additional exemplary embodiment of the machining method according to the invention is described. In contrast to the exemplary embodiments explained above, the cross-section 42 is enlarged in a plurality of successive machining steps along the cutting depth 46 and/or the cutting width 50 in a step-by-step manner along groove sections 45, the groove section lengths 44 of which are less than the total length 41 of the recess to be produced 40. The interruptions 43 are then removed in a plurality of successive machining steps.

Preferably, the cross-section to be achieved over the total cutting width 52 is produced in a plurality of machining steps, each at a partial cutting depth 48 over the groove section length 44. Subsequently, the remaining interruptions 43 are cut from the workpiece 6 at such partial cutting depth 48 over the total length 41.

Figure 10:
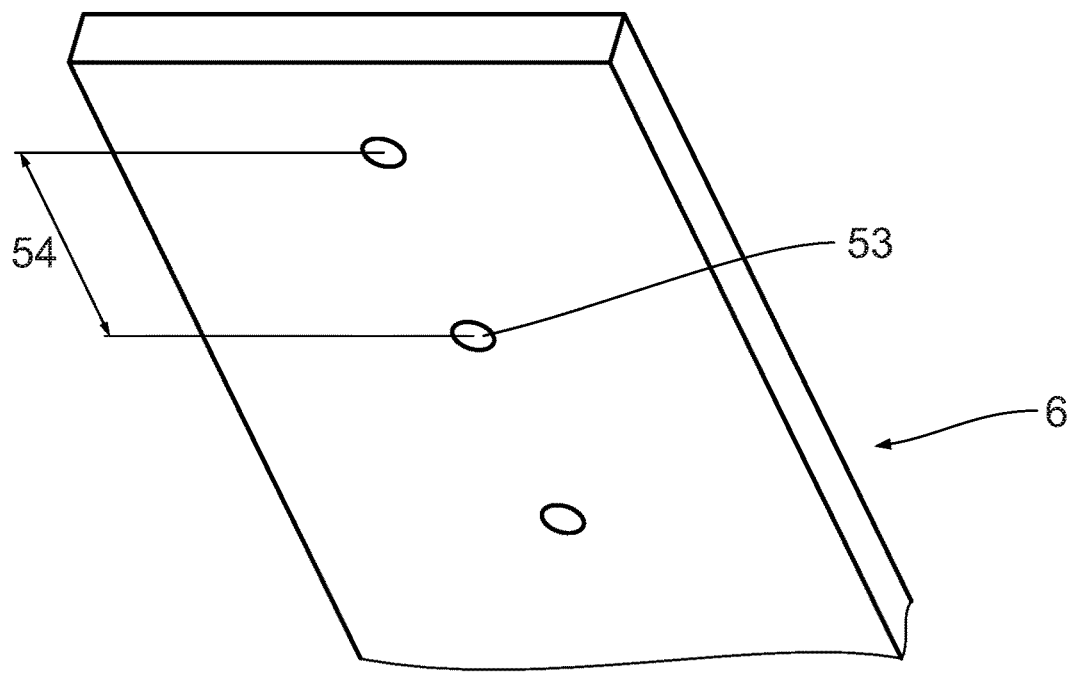
FIG. 10 is a perspective view of the workpiece in similar manner to FIG. 1, wherein the cutting of the recess is carried out in a plurality of machining steps according to an additional exemplary embodiment, wherein the workpiece is plastically deformed at a distance of the predetermined chip length before the cutting of the recess and wherein the workpiece is represented before the cutting of the recess and after the introduction of the plastic deformation.
Figure 11:
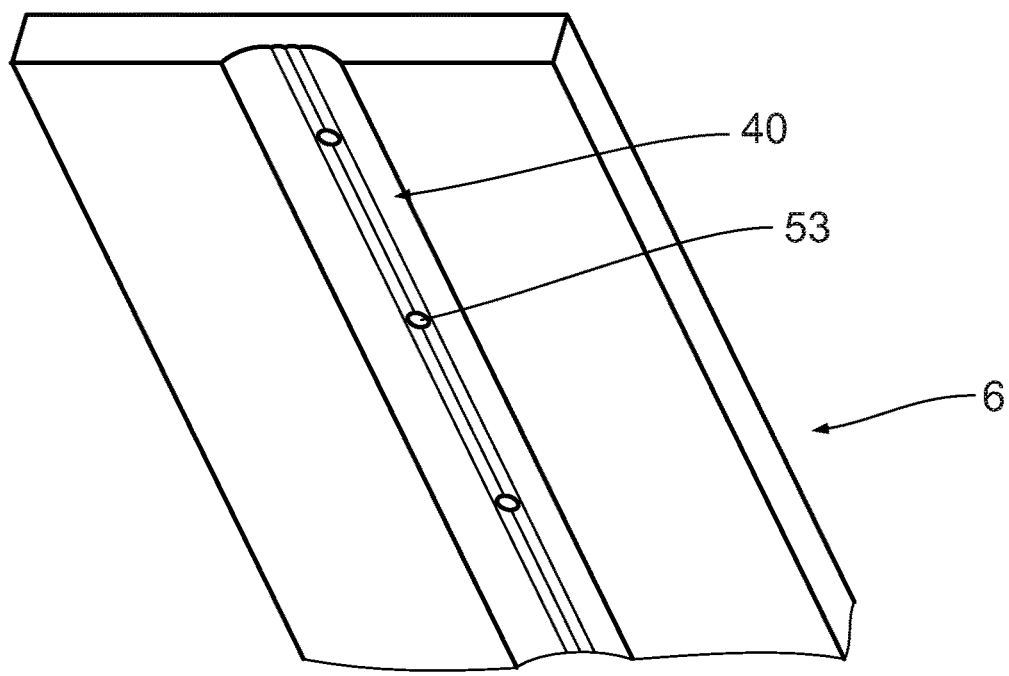
FIG. 11 is a perspective view of the workpiece in FIG. 10, wherein a plurality of machining steps of the cutting have been completed, but the recess has not yet been completely produced and the cutting has taken place at a cutting depth that is less than the total cutting depth of the recess to be produced.

On the basis of FIG. 10 and FIG. 11, an additional exemplary embodiment of the machining method is described. In contrast to the exemplary embodiments explained above, for producing the chip with the predetermined maximum chip length, the workpiece 6 is plastically pre-deformed along the recess 40 to be produced at a distance of the predetermined chip length. Before cutting the recess 40, an embossing tool (not shown) is provided on the machine tool 1. The embossing tool is preferably a center punch. By means of the embossing tool, 40 embossings 53, in particular granulations, are introduced into the workpiece 6 along the recess 40. In the area of the embossings 53, the workpiece 6 is hardened and exhibits reduced toughness.

Subsequently, the cutting tool 4 is provided at machine tool 1. The cutting tool 4 is arranged in the engagement position. The cutting tool 4 is displaced relative to the workpiece 6 in one or more machining steps in each case over the total length 41 of the recess 40 to be produced, wherein the cutting tool 4 remains in the engagement position. Based on the pre-deformation, in particular the reduced toughness of the workpiece 6 in the area of the embossings 53, the produced chips are separated from the workpiece 6 at the predetermined maximum chip length, which corresponds to an embossing distance 54 between two adjacent embossings 53.

The cross-section 42 of the recess 40 to be produced can be produced in a single machining step, or in a plurality of machining steps according to the exemplary embodiments described above, wherein the cutting depth 46 and/or the cutting width 50 are increased in a step-by-step manner.

Given the fact that chip is produced with the predetermined maximum chip length when cutting the groove-shaped recess 40, which is less than the total length 41 of the groove-shaped recess 40, the removal of the chips from the cutting tool 4 can be carried out with particular reliability. In particular, chip-removing channels, in particular the chip channel 27, becoming blocked can be prevented. Downtimes of the machine tool 1 can thus be reliably prevented, and the machining of workpieces 6 can thus be carried out particularly efficiently and economically.

What is claimed is:

1. A method for cutting a groove-shaped recess in a workpiece, comprising the steps of:
   providing a cutting tool attached to a machine tool at the workpiece;
   displacing the cutting tool into a cutting position, in which the cutting tool is in engagement with the workpiece; and
   displacing the cutting tool while in engagement with the workpiece relative to the workpiece and thereby cutting the groove-shaped recess,
   wherein, while cutting the groove-shaped recess, a chip is produced, the chip having a predetermined maximum chip length that is less than a total length of the recess to be produced, and
   wherein the predetermined maximum chip length is achieved by displacing the cutting tool, after cutting a predetermined groove section length, into a reset position in which the cutting tool is out of engagement with the workpiece.

2. The method according to claim 1, wherein the predetermined maximum chip length is achieved by separating the chip directly at the workpiece.

3. The method according to claim 1, wherein the cutting tool is repeatedly displaced between the cutting position and the reset position while cutting the groove-shaped recess.

4. The method according to claim 1, wherein the cutting tool is displaced relative to the workpiece over at least 50% of the total length of the recess without a backward displacement of the cutting tool along to the recess to be produced.

5. The method according to claim 1,
   wherein the cutting of the recess takes place in at least two machining steps,
   wherein the recess to be produced has interruptions along its longitudinal extension after a first machining step, and
   wherein the interruptions are removed in a subsequent machining step.

6. The method according to claim 1,
   wherein the cutting of the recess is carried out in at least two machining steps,
   wherein a cross-section of the recess is produced incompletely at least in sections after a first machining step and is completed in a subsequent machining step.

7. The method according to claim 6, wherein the cutting in the first machining step takes place in a partial cutting depth, which is less than a total cutting depth of the recess to be produced.

8. The method according to claim 6, wherein the cutting in the first machining step takes place at a partial cutting width, which is smaller than a total cutting width of the recess to be produced.

9. The method according to claim 1,
   wherein the cutting is carried out in at least two machining steps, and
   wherein the cutting tool is displaced in each of the at least two machining steps along an overall length of the recess to be produced.

10. The method according to claim 1, wherein, before the cutting, the workpiece is plastically pre-deformed in an area of the recess to be produced at an embossing distance corresponding to the predetermined maximum chip length.

11. The method according to claim 10, wherein an embossing tool is provided on the machine tool for the plastic deformation of the workpiece.

12. The method according to claim 1, wherein the cutting tool is provided on a punching device.

13. A method for cutting a groove-shaped recess in a workpiece, comprising the steps of:
   providing a cutting tool attached to a machine tool at the workpiece;
   displacing the cutting tool into a cutting position, in which the cutting tool is in engagement with the workpiece; and
   displacing the cutting tool while in engagement with the workpiece relative to the workpiece and thereby cutting the groove-shaped recess,
   wherein, while cutting the groove-shaped recess, a chip is produced, the chip having a predetermined maximum chip length that is less than a total length of the recess to be produced,
   wherein the cutting of the recess takes place in at least two machining steps,
   wherein the recess to be produced has interruptions along its longitudinal extension after a first machining step,
   wherein the interruptions are removed in a subsequent machining step, and
   wherein an interruption length essentially corresponds to a groove section length of directly adjacent groove sections already produced.

14. A method for cutting a groove-shaped recess in a workpiece, comprising the steps of:
   providing a cutting tool attached to a machine tool at the workpiece;
   displacing the cutting tool into a cutting position, in which the cutting tool is in engagement with the workpiece;
   displacing the cutting tool while in engagement with the workpiece relative to the workpiece and thereby cutting the groove-shaped recess; and
   edge bending the workpiece at the groove-shaped recess,
   wherein, while cutting the groove-shaped recess, a chip is produced, the chip having a predetermined maximum chip length that is less than a total length of the recess to be produced.

* * * * *